(Specimens.)
R. SMITH.
PREPARING WHEAT FOR FOOD.
No. 396,621. Patented Jan. 22, 1889.
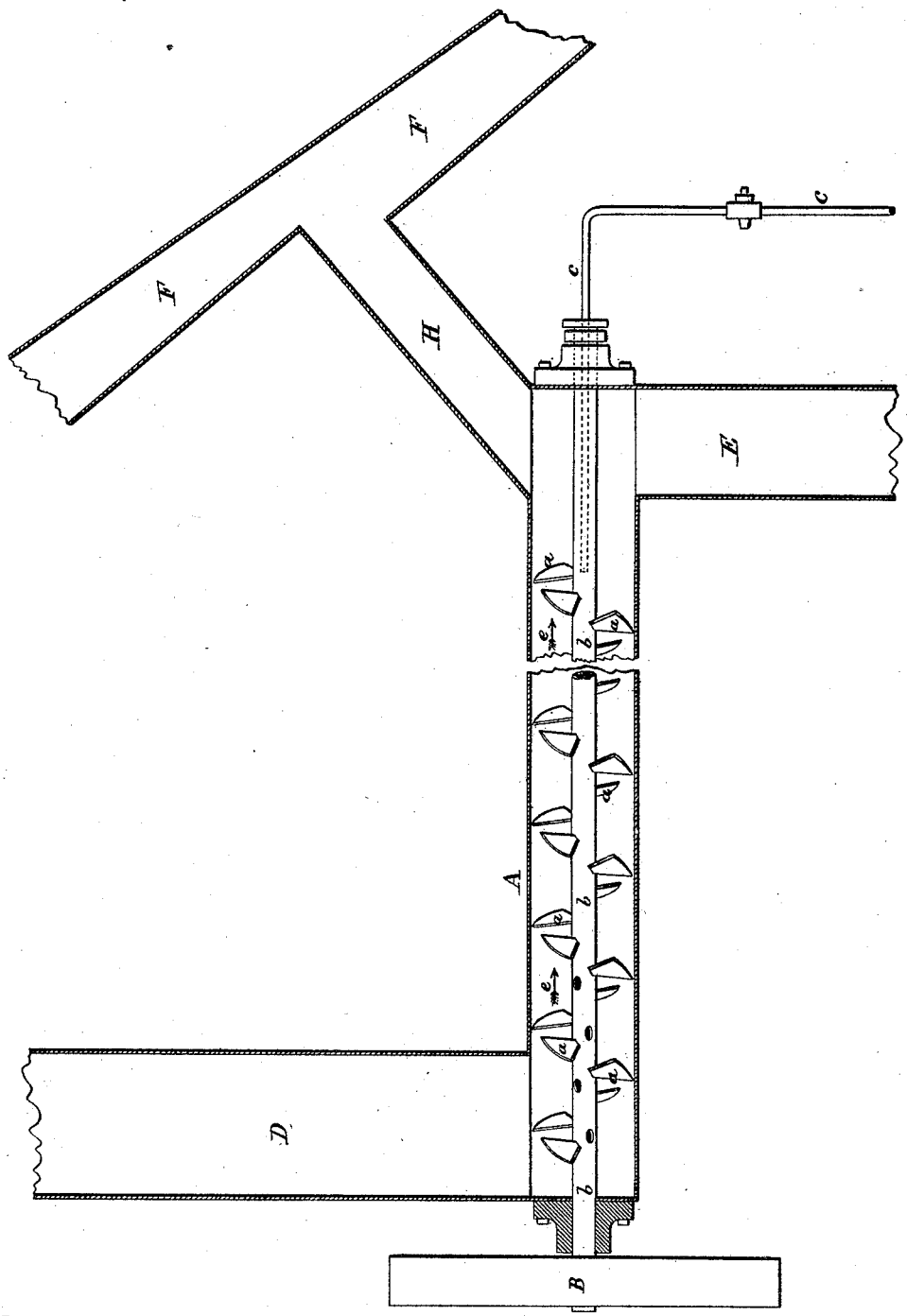
WITNESSES:-
INVENTOR:-
Richard Smith
BY
ATTORNEY.

UNITED STATES PATENT OFFICE.

RICHARD SMITH, OF STOKE-ON-TRENT, COUNTY OF STAFFORD, ENGLAND.

PREPARING WHEAT FOR FOOD.

SPECIFICATION forming part of Letters Patent No. 396,621, dated January 22, 1889.

Application filed January 29, 1887. Serial No. 225,914. (Specimens.) Patented in England October 6, 1886, No. 12,736; in France November 2, 1886, No. 179,389, and in Germany March 22, 1887, No. 42,457.

*To all whom it may concern:*

Be it known that I, RICHARD SMITH, a subject of the Queen of Great Britain, residing at Stoke-on-Trent, in the county of Stafford, England, have invented a certain new and Improved Treatment of the Wheat-Germ and Broken Wheat, (for which I have obtained Letters Patent in England, No. 12,736, dated October 6, 1886; in France, No. 179,389, dated November 2, 1886, and in Germany, No. 42,457, dated March 22, 1887;) and I do hereby declare that the following is a full, clear, and exact description of the invention, which will enable others skilled in the art to which it appertains to make and use the same.

The objects of this invention are to produce a wheat-flour having the nutritive qualities and nutty flavor of the wheat-germ without the danger of discoloration and rancidity usually incident to the presence of the germ of the wheat.

For the purpose of carrying my invention into practice I take the germ of the wheat, which has been previously separated in any suitable manner from the other parts of the wheat-berry, and subject such germs to the action of superheated steam. After the flavor of the wheat-germs is imparted to the steam, I subject broken wheat to the action of the same steam, whereby the empyreumatic flavor of the wheat-germ is imparted to the broken wheat. I also mix the steam-cooked wheat-germs with broken wheat or wheat-flour.

The figure of the accompanying drawing is a longitudinal vertical section of an apparatus for carrying out my invention.

A is a tubular steaming-vessel of any desired capacity, furnished with a hollow revolving spindle, *b b*. This spindle *b b* is perforated along a portion of its length with small apertures to permit of the escape of the steam. It is also furnished with arms or blades *a a*, which are so beveled that when the spindle *b b* revolves the germ in the vessel A is caused to travel in the direction of the arrows *e e*. The spindle *b b* is caused to revolve by means of a pulley, B.

*c* is a steam-pipe conducting steam into the center of the spindle *b b*.

D is a hopper which feeds into A. This trough is constantly kept full of germ, so as to prevent the steam escaping in that direction.

E is a chute into which the germ falls after it has undergone the process of steaming.

The steam, after it has operated on the germ, is carried off by the pipe H, and meets the broken wheat passing down the trough F F. I prefer to treat the wheat with the steam after the first break and before the second break; but the process of steaming may with advantage be repeated at any time before the last break. Whatever the pressure of the steam may be at various times in the boiler from which the steam is taken, it is advisable to use a reducing-valve, so as to obtain one uniform pressure—say about twenty pounds per square inch—in the pipe between the reducing-valve and the steaming-vessel A; and, as it is necessary to use the steam as dry as possible, I superheat the steam after it has passed the reducing-valve, which causes less waste by condensation and gives generally a better result. The germ passing out at E may be ground into flour and be used for mixing with the flour made from the grain with great advantage to its nutritive power.

By the above treatment the germ of wheat which has been separated from the other parts of the grain, and which hitherto has only been of use as food for cattle, is rendered suitable for use as an article of human food, preferably to be mixed with steamed broken wheat prior to milling. The germ not only imparts a superior flavor to the flour produced from the admixture, but has the peculiar property of increasing the weight of bread which can be produced from a given weight of flour.

By steaming the broken wheat with the superheated steam impregnated with the empyreumatic flavor obtained from the germ this flavor is transferred to the wheat, and the value of the flour produced (even if it should not be deemed desirable to add to it any germ-flour) is greatly increased.

Having now described and ascertained the nature of my invention and the manner in which the same is to be performed, I wish it to be understood that I do not claim the steaming of wheat in itself; but

What I do claim is—

The process of preparing wheat for use as food, which consists in subjecting wheat-germs to the action of superheated steam until the flavor of the germs is imparted to the steam, and then subjecting the broken wheat to the action of the same steam, substantially as described.

RICHARD SMITH.

Witnesses:
HARRY A. McLELLAN,
CHAS. A. ALLISON.